Jan. 29, 1957 C. C. GROTNES 2,779,301
APPARATUS FOR FORMING BARREL SEAMS
Filed March 10, 1951 5 Sheets-Sheet 5

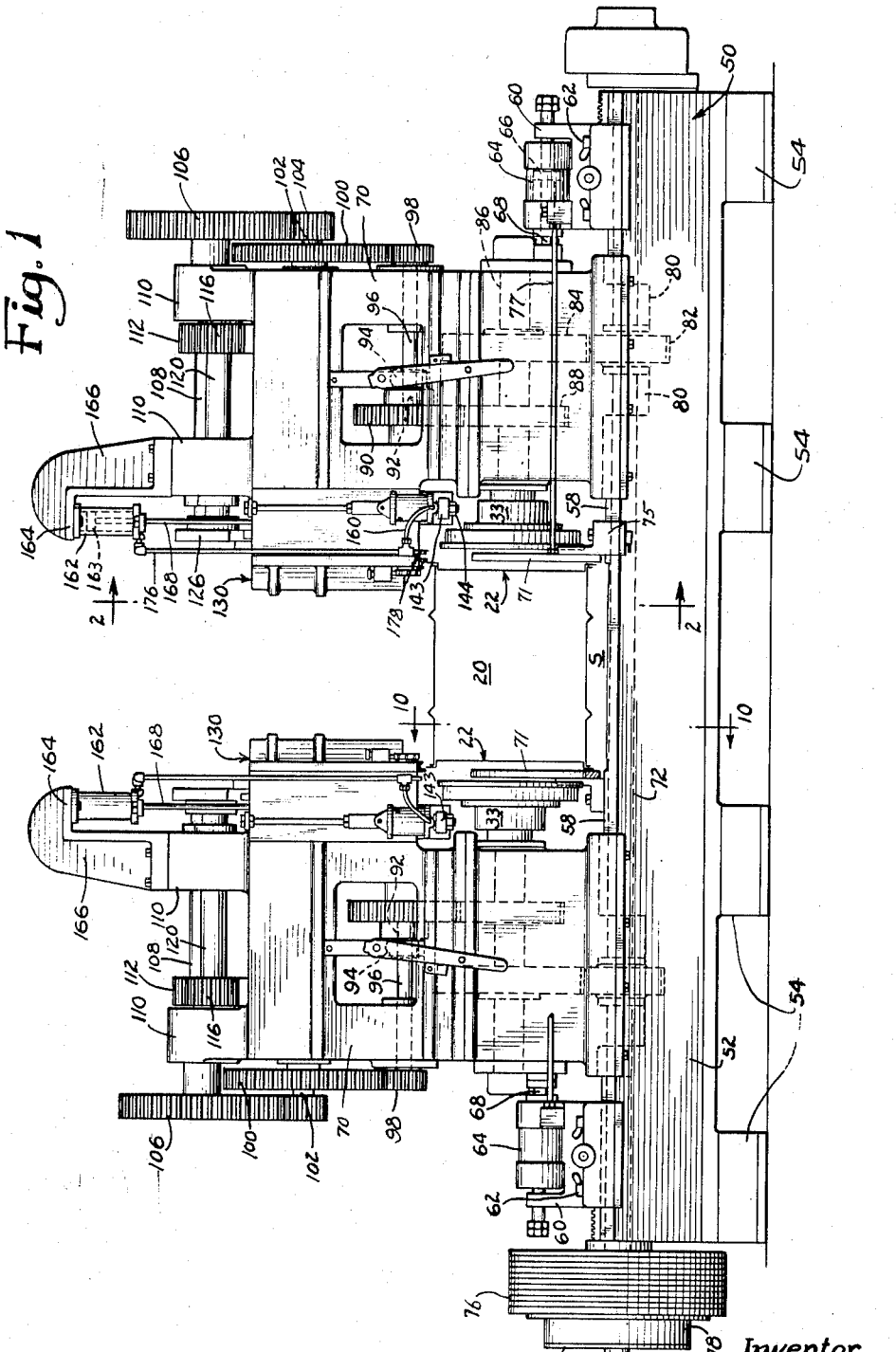

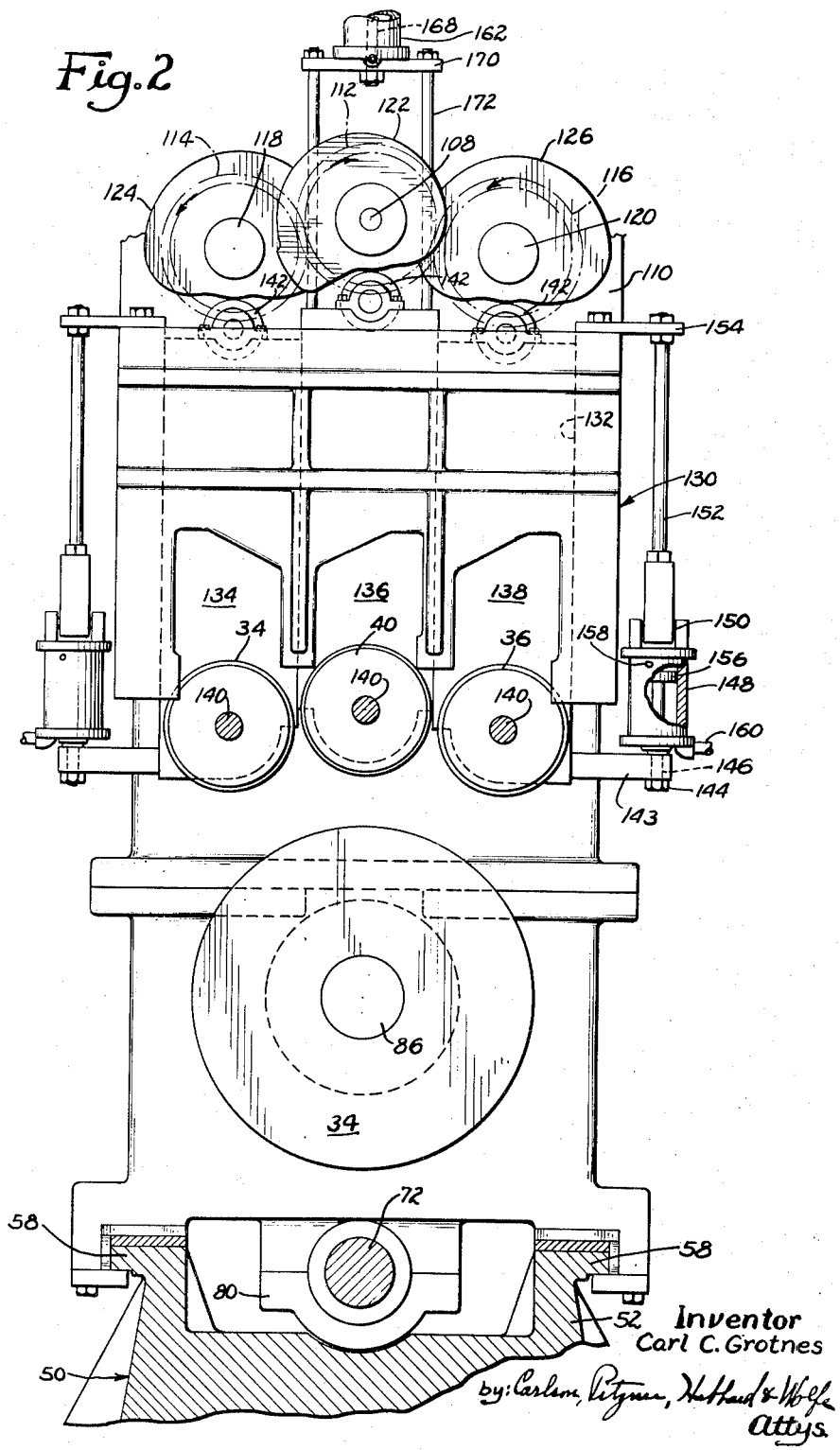

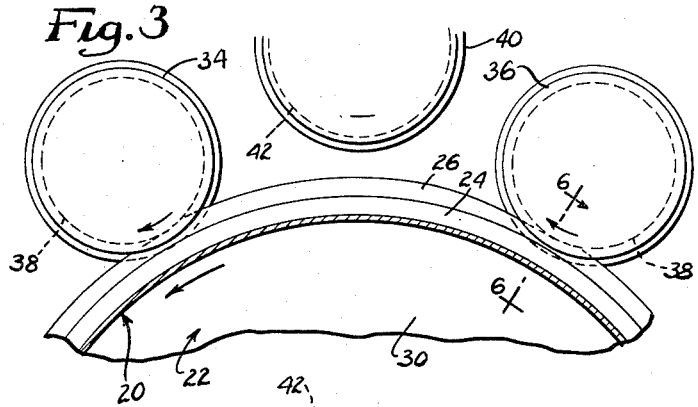
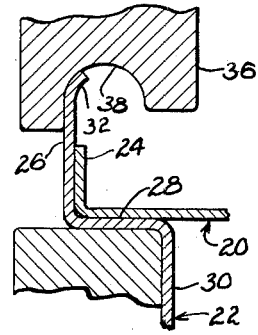
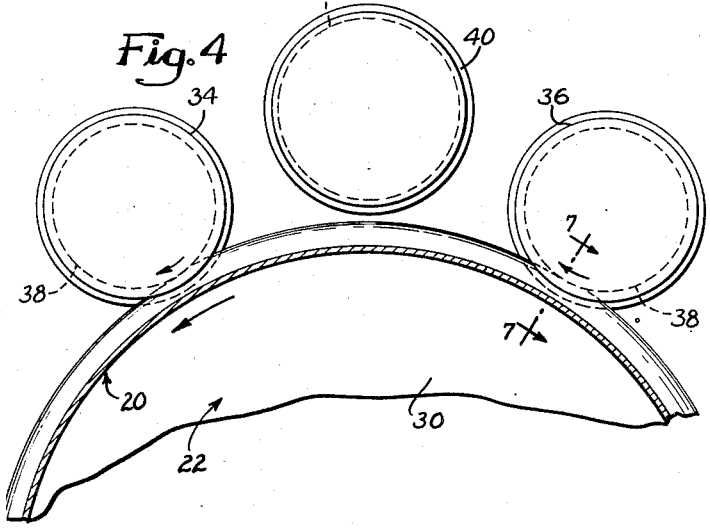
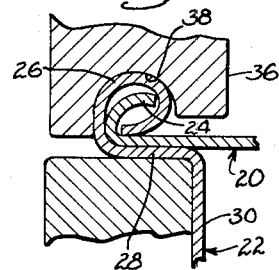
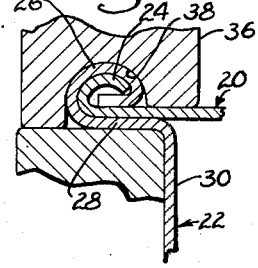
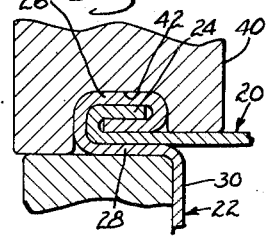
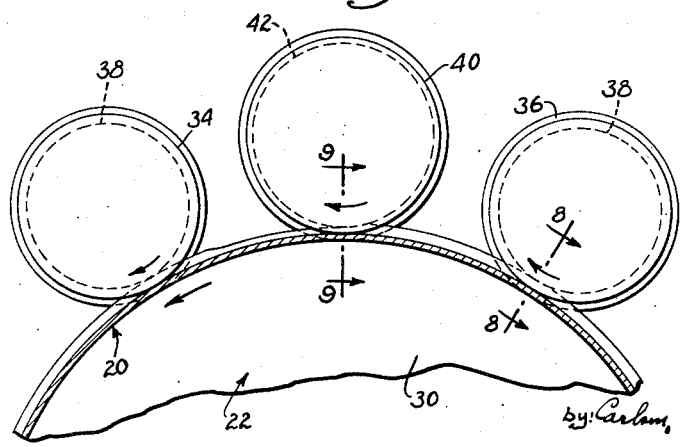
Inventor
Carl C. Grotnes

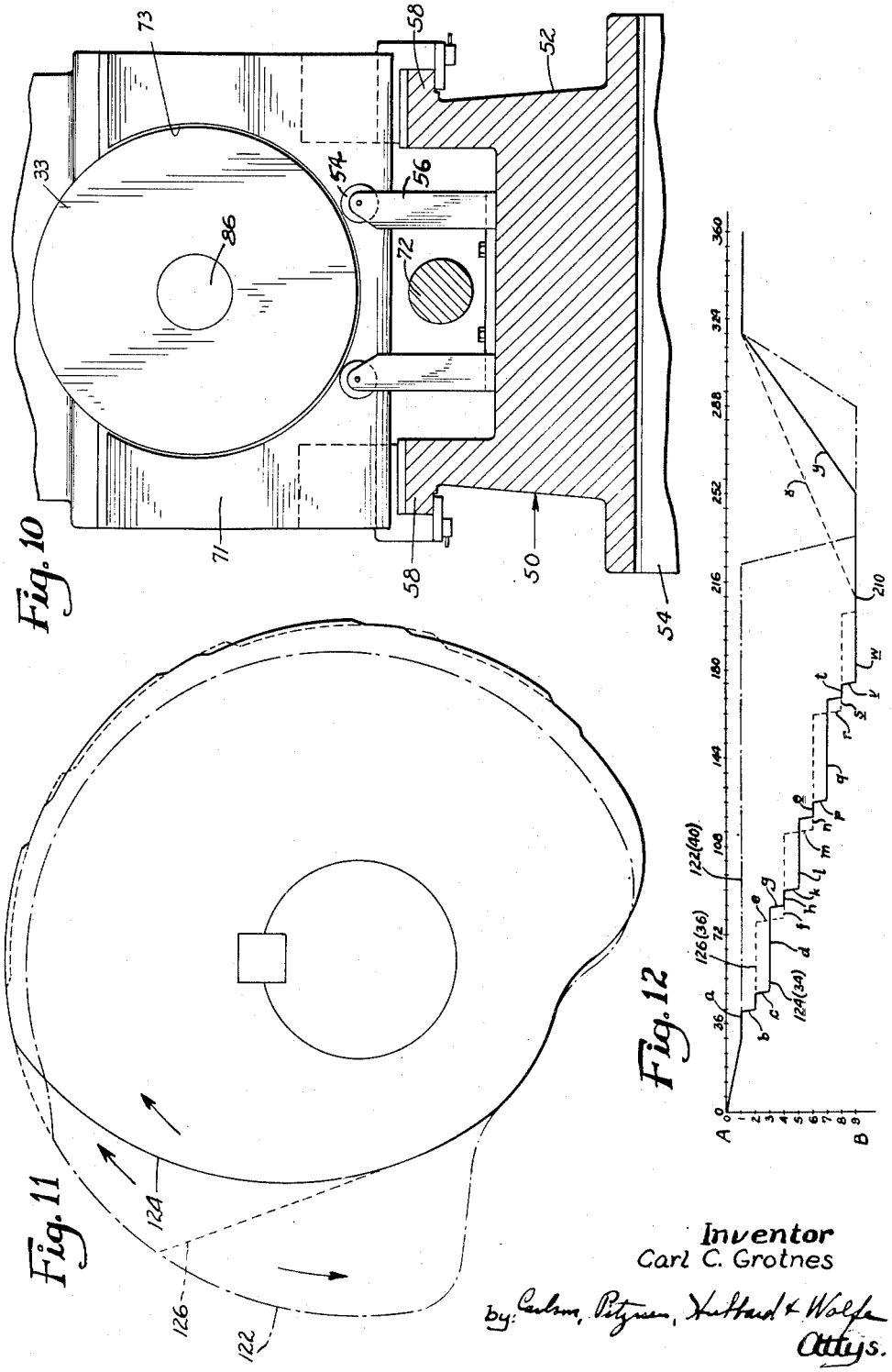

United States Patent Office 2,779,301
Patented Jan. 29, 1957

2,779,301

APPARATUS FOR FORMING BARREL SEAMS

Carl C. Grotnes, Park Ridge, Ill., assignor, by mesne assignments, to Grotnes Machine Works, Inc., a corporation of Illinois Application March 10, 1951, Serial No. 214,937

2 Claims. (Cl. 113—23)

The present invention relates to an apparatus for forming seamed joints between the body and heads of a sheet metal barrel or similar structure and has as a general object the production of an improved method and machine for this purpose whereby the seaming operation may be effected efficiently and expeditiously.

More particularly, the invention relates to improvements in seaming machines by means of which the heads are applied to the cylindrical barrel body by a rolling operation, utilizing roller dies which operate upon the barrel body and head in the region of their juncture during rotation of the body and head about the longitudinal axis of the body.

It is among the principal objects of the invention to provide a seaming machine of the type briefly outlined above in which the contiguous flange portions of a rotating barrel and a head to be joined together are presented to a pair of primary curling rolls which are fed to the flange portions in a novel manner which enables both rolls to act at the same time and roll them into an interlocking seam, by a progressive breakdown operation on the flanges of the barrel and head. More particularly, the inventive aim is to provide a seaming machine in which the actions of the two rolls are coordinated so as to enable each roll to perform its metal shaping operation at the maximum rate permitted by the character of the metal involved whereby the seaming operation is completed in a shorter length of time and consequently with a fewer number of revolutions of the barrel than has heretofore been possible.

In carrying out the above mentioned object, the invention contemplates the provision of a barrel seaming machine of this type in which a pair of primary seaming rolls are advanced upon each seam undergoing formation in alternate fashion in such a manner that each roll operates at all times to produce its maximum breakdown action until such time as the seam is ready for the final flattening and interlocking of the seam.

Other objects and advantages of the invention, not at this time enumerated, will become more readily apparent as the nature of the invention is better understood.

In the accompanying four sheets of drawings forming a part of this specification, one embodiment of the invention has been illustrated.

In these drawings:

Fig. 1 is a side elevational view of a barrel seaming machine constructed in accordance with the principles of the present invention.

Fig. 2 is a sectional view taken substantially along the line 2—2 of Fig. 1.

Figs. 3, 4 and 5 are similar, enlarged, fragmentary sectional views taken transversely through a barrel and head undergoing seaming in the vicinity of the seaming rolls and illustrating, somewhat schematically, the progressive steps or movements performed by the seaming rolls.

Fig. 6 is a sectional view taken substantially along the line 6—6 of Fig. 3.

Fig. 7 is a sectional view taken substantially along the line 7—7 of Fig. 4.

Fig. 8 is a sectional view taken substantially along the line 8—8 of Fig. 5.

Fig. 9 is a sectional view taken substantially along the line 9—9 of Fig. 5.

Fig. 10 is a sectional view taken substantially along the line 10—10 of Fig. 1.

Fig. 11 is a plan view, entirely schematic in its representation, of a set of seaming cams employed in connection with the invention and illustrating the operational relationship each bears to the other, and Fig. 12 is a timing chart showing the operation of a plurality of seaming rolls employed in connection with the invention.

Figure 12A:
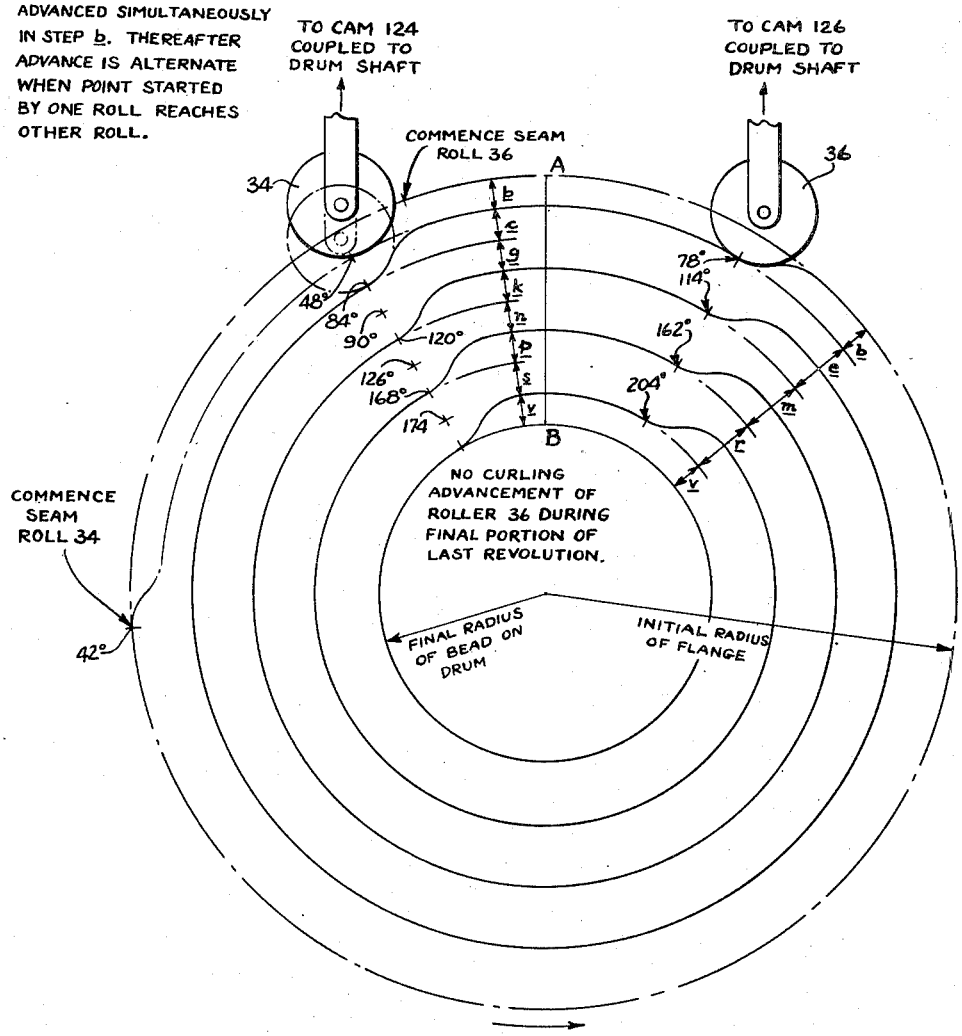
Fig. 12a is a diagram showing the roll advancing sequence relative to the rotations of the drum.

While the invention is susceptible of various modifications and alternative constructions, there is shown in the drawings and will herein be described in detail the preferred embodiments, but it is to be understood that it is not thereby intended to limit the invention to the forms disclosed, but it is intended to cover all modifications and alternative constructions falling within the spirit and scope of the invention as expressed in the appended claims.

Referring now to the drawings in detail, the barrel which is to be operated upon by the improved seaming machine for connecting the drum and heads thereof may be constructed in various ways but the barrel illustrated in the accompanying drawings as exemplary of one capable of being produced by this machine comprises a cylindrical body or drum 20 of relatively heavy sheet metal and two disk-shaped heads 22 likewise of relatively heavy metal secured to opposite ends of the drum. The opposite ends of the drum are provided with laterally extending flanges 24 (Figs. 3 and 6) and each head is provided in the circumferential regions thereof with an outwardly extending annular rim 26 which is integrally joined at its inner edge with a cylindrical apron or flange 28 which projects axially from the peripheral edge of the disk-shaped body portion 30 of the head 22. The extreme peripheral regions of the annular rim 26 may be preformed with a slight reverse roll or curve as indicated at 32 in accordance with modern practice in forming such heads.

In the operation of seaming the drum and heads of a barrel each head is placed in a properly oriented position of axial alinement with the open end of a drum between the forward face of a rotary chuck 33 and the drum end, and thereafter the chuck is advanced to engage the head and move the same bodily into engagement with the drum so that the cylindrical flange 28 of the head enters the end of the barrel with a close fit. The drum 20 is thus engaged on the inner side of each end with the outer side of the apron 28 while the opposed surfaces of the drum flange 24 and the rim 26 of the head are brought into contiguity as shown in Fig. 6. After the drum and heads have been thus assembled and the same are rotating about the axis of the barrel, both ends of the latter are presented to a pair of circumferentially spaced primary or preliminary seaming rolls 34 and 36 (Fig. 3) each of which is provided on its periphery with a seaming groove 38 and which is adapted to rotate in engagement with the rim 26 of the head at one end of the barrel so as to produce a curl or interlock of the flange 24 and rim 26 as shown in Figs. 6, 7 and 8.

The two seaming rolls are first advanced upon the rim 26 and flange 24 in unison so as to engage the rim substantially simultaneously and the two rolls are advanced in engagement with the flange 26 while the barrel continues to rotate so as to progressively generate a slight preliminary curl in an arcuate extent of the curved portion 32 of the rim 26. This operation is followed by a further advance of the roll 34 which progressively applies a further increment of curl to an arcuate extent of the partially formed seam. Thereafter the roll 36 is caused to radially lead the roll 34 and apply a still further increment of curl to another arcuate extent of the partially formed seam. During the period of time existing from the commencement of the first forming operation performed simultaneously by both rolls 34 and 36 until the finish of the second operation performed by the roll 34, the barrel will make one complete revolution and thereafter the progressive operation of the rolls, involving simultaneous advancement of the rolls followed by a leading first of one roll and secondly of the other roll, is repeated a number of times. Each repetition of such relative roll movement follows substantially the same pattern and results in progressive forming or curling of the seam.

After the seam has assumed the limit of its curling operation as permitted by the shape and movements of the preliminary seaming rolls 34 and 36, these rolls are retracted and the thus partially formed seam is presented to a final forming, finishing or flattening roll 40 (Fig. 9) having a finishing groove 42 on its periphery adapted to rotate in engagement with the partially formed seam. The flattening roll 40 is advanced upon the seam and is operable to press the seam into the substantially flat form illustrated in Fig. 9 and cause the flange 24 and rim 26 to firmly engage with each other and form the interlock arrangement illustrated in this figure.

The machine which embodies the mechanism for rotatably supporting the barrel drum 20 and for operating the seaming rolls 34 and 36 is preferably cyclic in its operation and involves in its general organization a main frame 50 (Figs. 1 and 2) including a base plate 52 carried upon adjustable legs 54 by means of which the height of the base plate may be adjusted relative to a drum conveyor (not shown) which may be employed for the purpose of delivering the drums to the machine at a seaming station S situated in the central longitudinal region of the machine. A pair of supporting and locating rollers 54 (Fig. 10) mounted on suitable brackets 56 are provided at the seaming station S for the purpose of engaging and supporting the barrel prior to the time at which the chucks 33 are advanced into engagement with the heads 22.

The base plate 52 is provided with a pair of longitudinally extending upstanding supporting and guide rails 58 which extend along the opposite sides of the frame 50 and which are substantially coextensive therewith. A pair of supporting blocks 60 are mounted on the rails 58, each adjacent one end of the machine, and are capable of being clamped to the rails by suitable clamping mechanism 62 in any desired adjusted longitudinal position. Each supporting block 60 has mounted thereon a hydraulic operating cylinder 64 having associated therewith a piston 66 and a piston rod 68. Each piston rod has its outer end suitably connected in driving relationship to a longitudinally reciprocable housing 70 which is adapted to support in operative relationship the various seaming instrumentalities by means of which the flange 24 and rim 26 on the drum 20 and head 22 respectively are formed or seamed so that they assume the interlocking relationship illustrated in Fig. 9.

The two housings 70 are slidably supported on the guide rails 58 and, in the operation of the machine, they are adapted to be moved in unison away from each other to permit a drum and its associated heads to be assembled at the seaming station S and to thereafter be moved in unison toward each other to bring the two chucks 33 into engagement with the heads so that the latter are forced into the open ends of the drums in the manner previously described. A pair of stripper plates 71 (Figs. 1 and 10) are adapted to be positioned adjacent the forward ends of the chucks 33. These stripper plates are in the form of flat plates having a circular open central region 73 formed therein the diameter of which is slightly less than the overall diameter of the finished circumferential seams which are formed at the opposite ends of the barrel. The stripper plates 71 are adapted to be clamped, as at 75, in any desired position of adjustment to accommodate the seaming of barrels of different lengths and they are adapted to be reinforced against lateral thrust by means of tie rods 77 the opposite ends of which are secured to the stripper plates and to the blocks 60.

The instrumentalities for seaming each end of the barrel are substantially identical in their construction and in their operation and it is thought that a description of one set of instrumentalities will suffice for the other. Accordingly, similar characters of reference have been applied to the corresponding seaming devices of each housing 70. It will be understood that adjustment of the relative positions of the blocks 60 may be made for the purpose of adapting the machine to the seaming of barrels of different lengths since the stroke of each piston 66 and consequently the movement of its piston rod 68 remains substantially the same. Motive fluid is adapted to be applied in the proper manner to the opposite ends of each cylinder 64 by suitable valve control means (not shown) to move the two housings 70 toward and away from each other to receive and engage a barrel assembly therebetween according to the cyclic operation of the machine.

The main driving shaft of the machine is designated at 72 and is journaled horizontally and longitudinally in the base plate 52. The shaft 72 is adapted to be driven through a clutch 74 of conventional design from a driving pulley 76 having a belt 78 associated therewith leading from the driving pulley of a suitable motor (not shown). The pulley 76 is adapted to be continuously driven and torque is adapted to be applied from the pulley 76 to the main driving shaft 72 periodically in accordance with the rate of feeding of the drums 20 to the seaming station S. If desired, the clutch 74 may be manually controlled so that each time a drum 20 and its associated heads 22 have been assembled at the seaming station the clutch 74 is engaged so that the driving shaft 72 will commence to rotate to initiate a single machine cycle wherein the seaming operation is performed on an individual barrel.

Each housing 70 is provided with a pair of downwardly extending flanges 80 which serve to confine therebetween a pinion 82 which is splined to and adapted to rotate with the driving shaft 72. Each pinion 82 meshes with a relatively large gear 84 carried on a counter shaft 86 journaled in the housing 70 and the counter shaft 86 carries a smaller gear 88 meshing with a large gear 90 mounted on the input shaft 92 of a clutch assembly 94. The output shaft 96 of the clutch assembly carries a relatively small gear 98 which meshes with a larger gear 100 carried on a shaft 102 which in turn has mounted thereon a small gear 104 meshing with a larger gear 106 mounted on a cam-driving shaft 108, the latter shaft being rotatably journaled in and extending across a pair of supporting standards or ribs 110 which are formed in spaced relationship at the top of the housing 70. The shaft 108 carries thereon a driving gear 112 which meshes with a pair of gears 114, 116 on opposite sides thereof. The gear 114 is mounted on a cam shaft 118 while the gear 116 is mounted on a cam shaft 120, the shafts 118 and 120 being rotatably journaled in the standards 110. The three shafts 108, 118 and 120 project completely through one of the standards 110 and carry at their outer ends respective seaming cams 122, 124 and 126. The driving shaft 108 and consequently the cam 122 carried thereby is adapted to be rotated in a clockwise direction as viewed in Fig. 2, and as a consequence the shafts 118 and 120, together with cams 124 and 126 mounted thereon, are adapted to be rotated in a counterclockwise direction as viewed in this figure.

The inner opposed faces of the housings 70 have mounted thereon respective cage-like guide brackets or castings 130. Each casting 130 is provided with guideways 132 therein in which there are slidably disposed a plurality of vertically movable or reciprocable roll-supporting slide members which, reading from left to right in Fig. 2, are designated at 134, 136 and 138. The members 134, 136 and 138 are in the form of box-like or frame-like structures each of which carries at its lower end a transverse stub shaft 140. The previously described preliminary seaming rolls 34 and 36 are rotatably mounted on the two outside shafts 140 as viewed in Fig. 2 while the flattening roll 40 is rotatably carried on the medial stub shaft 140. The upper end of each box-like slide member 134, 136 and 138 has suitably mounted thereon a thrust roller or cam follower 142 and each of the three follower-rollers 142 is designed for cooperation with a respective cam 122, 124 or 126, as the case may be.

Reference to Fig. 2 will disclose the fact that the preliminary seaming rolls 34 and 36 and the flattening roll 40 are so mounted that the same are capable of periodic movement toward and away from the flanges on the adjacent end of the barrel. By virtue of the adjustment permitted the cylinder supporting blocks 60, the positions of the housings 70 and consequently of the rolls 34, 40 and 36 may be adjusted lengthwise of the axis of the barrel for adapting the rolls to the flanges of barrels of different lengths. Such adjustment may also be effected to initially adjust the machine and also to take up wear.

The three slides 134, 136 and 138 are adapted to be normally urged in an upward direction to the limit of their extent of upward movement by pneumatic means. Accordingly, each of the slides 134 and 138 has a laterally extending bracket 143 projecting outwardly from the bottom regions thereof beyond the confines of the cage-like casting 130. The outer end of the bracket 143 is secured as at 144 to the piston rod 146 of a cylinder 148. The cylinder 148 is pivotally secured as at 150 to a tension link 152, the upper end of which is secured to the outer end of a bracket 154 which extends laterally from the casting 130. The piston rod 146 is operatively connected to a piston 156 disposed within the cylinder 148 and the upper end of the cylinder 148 is provided with a bleeder port 158 while the lower end of the piston communicates with fluid line 160 which may be connected to a suitable source of motive fluid under pressure and by means of which fluid is supplied to the cylinder 148 at all times so that the slides 134 and 138 are thus normally urged in an upward direction against the action of fluid pressure developed in the lower portion of the cylinder 148.

The slide 136 is likewise normally urged upwardly by fluid operated means including a cylinder 162 (Fig. 1) having a piston 163 disposed therein and which is suspended from an overlying offset portion 164 provided on a bracket 166 suitably secured to one of the standards 110. The piston 163 is provided with a piston rod 168 which is secured to a cross head 170 which in turn is operatively connected by means of a pair of links 172 to the slide 136. The lower end of the cylinder, beneath the piston, communicates with a fluid line 176 leading to the source of motive fluid under pressure. The fluid lines 160 and 176 may be continuously connected to each other and to a main fluid supply line 178 leading to the source of motive fluid.

In order to illustrate specifically the preliminary seaming action performed by the seaming rolls 34 and 36 upon the flanges 24 and rim 26 of the drum 20 and head 22, respectively, the schematic representation of Fig. 11 has been employed. In this view, the outlines of the three cams 122, 124 and 126 have been superimposed, one upon the other so that the contours of these cams may be compared and the manner in which one contour leads the other when operating upon the respective follower rollers 142 may be ascertained. It will be understood, of course, that the cams 124 and 126 assume similar or corresponding relative positions of orientation on their respective shafts 118 and 120 at any particular increment of time and also that these two cams rotate uniformly at the same rate of movement in the same clockwise direction of rotation as viewed in Fig. 11.

While any desired degree of relative rotation between the cams 122, 124, and 126 and the barrel assembly at the seaming station S may be effected, for best results the present machine has been so designed according to engineering exigencies that each time the cams 122, 124, and 126 make one complete revolution the chucks 33 shall complete approximately ten revolutions. This number of revolutions of the barrel is adequate to produce an effective and efficient interlocked seam. The horizontal distance between the paths of movement of the axes of the rolls 34 and 36, when the latter are in seaming position, is such that these rolls make contact with the flange 24 on the head 22 at points which are spaced apart or which subtend an arc of approximately 60°. In the diagram of Fig. 11, the superimposed outlines of the two cams 124 and 126 possess the same relative degree of orientation. The initial point at which the periphery of either cam 124 or 126 takes effect on its follower roller 142 has been labeled A, and the point of maximum displacement of these cams has been labeled B. Thus the total displacement of the seam during the preliminary seaming operation is represented by the distance A—B. For convenience of differentiation, the cam 124 has been shown in full lines while the cam 126 has been shown in dotted lines.

Referring now to Figs. 11 and 12 wherein the operation of the various seam forming rolls 34, 36 and 40 is diagrammatically illustrated, in Fig. 11 the contours of the cams 124 and 126 which control the movements of the primary seaming rolls 34 and 36 have been shown as being superimposed upon each other with the cams occupying the respective positions of orientation which they assume at the commencement of each cycle of machine operation wherein a complete seam is formed between a head 22 and one end of a drum 20. It will be understood of course that the cams 124 and 126 occupy spaced positions with respect to each other and are rotatable about respective parallel axes which are the longitudinal axes of the shafts 118 and 120. In Fig. 11 these two axes have been brought into coincidence. In Figs. 12 and 12a, the effective strokes of the two preliminary seaming cams 124 and 126 have been designated by the single line existing from the points labeled A and B and the effective stroke of each cam at any particular increment of time during the seaming operation will lie on the line between these two points. In Fig. 12, which is a timing chart showing the operation of the three seaming cams including the two preliminary seaming cams 124 and 126 and the flattening cam 122, the effective stroke of these cams is represented by the three stepped lines distance on the chart. The effective stroke of the preliminary seaming cam 124 throughout the machine cycle is shown in full lines. The effective stroke of the preliminary seaming cam 126 is shown in dotted lines and the effective stroke of the finishing or flattening cam 122 is shown in broken lines. The various rolls 34, 36 and 40 perform their movements in stepped fashion and the various steps which are effected under the control of the cams 124, 126 and 122 are represented by the labeling 0 to 9 inclusive and thus for the purposes of discussion it may be assumed that ten phases of operation are involved in the movements of the various seaming rolls. These ten phases of operation suffice for the formation of a finished seam in a barrel assembly and correspond to one complete revolution of the cams 124, 126 and 122 in unison and ten complete revolutions of the drum 20. It will be evident therefore that the drum rotates through an angle of ten degrees for each degree of rotation of the cam.

Considering now only the operation of the two preliminary seaming rolls 34 and 36, rotation of the associated cams 124 and 126 in the counterclockwise direction indicated by the arrows in Fig. 2 throughout the first 30° is without function as far as the seaming operation is concerned and serves merely to cause a lowering of the slides 134 and 138, and consequently of the rolls 34 and 36 into initial contact with the rim 26 of the head 22. At this point in the machine cycle the seaming grooves 38 of the two rolls 34 and 36 engage the flange 26 at spaced regions therearound which are approximately 60° apart on the circumference of the drum 20. This initial contact, represented at $a$ in Figs. 12 and 12$a$, is maintained throughout approximately 12°, and at approximately 42° in the machine cycle a rise $b$ occurs in both cams 124 and 126 which causes the rolls 34 and 36 to be depressed to thus commence the formation of the seam. At approximately 48° in the machine cycle or a 60° rotation of the drum since the rolls commenced their curling operations, a rise $c$ in the cam 124 causes further depression of the roll 34 to increase the seam extent and the position of the roll 34 is maintained for approximately 36° as represented at $d$ during which time the roll 34 leads the roll 36. At approximately the time when the effect of the trailing roll 36 (Fig. 3) has traversed the circumference of the drum so that the thus deformed portion of the seam arrives at the leading roll 34 or at approximately 78°, a rise $e$ in the cam 126 causes the roll 36 to lead the roll 34 and this lead $f$ is maintained for about 6° or until approximately 84° in the cycle at which time a rise $g$ in the cam 124 closes the lead so that the two cams 124 and 126 have the same effective stroke indicated at $h$ until approximately 90°.

From 90° throughout approximately the next 42° or until 132° in the machine cycle the same relative leads of the two cams 124 and 126 as took place between 42° and 90° in the cycle is repeated, or in other words, the roll 34 will lead the roll 36 as at $k$ and $l$ and the roll 36 will lead the roll 34 as at $m$ and $n$ with the roll 34 assuming the same lead as the roll 36, represented at $o$. This repetition in the respective leads of the two rolls is again repeated from 132° to approximately 174° in the machine cycle with the lead of the roll 34 being represented at $p$ and $q$ and the lead of the roll 36 being represented at $r$ and $s$ and with the roll 36 assuming the same lead as the roll 34 at $t$. At $u$ and $v$ the roll 34 again leads the roll 36 and at $w$, extending from approximately 204° to 210°, the rolls 34 and 36 assume the same lead and are at the lowermost point in their stroke as represented by the disclosure of Fig. 8. At approximately 210° the roll 36 commences to recede as at $x$ and retraction of the roll is substantially complete at 324°. The roll 34 continues to hold and at approximately 258° it commences to recede as at $y$ with its retraction being complete at approximately 324°.

From the above description of the relative movements of the rolls 34 and 36 it will be observed that when the roll 34 first leads the roll 36 as shown at $c$ and $d$ in Fig. 12 at approximately 48°, the position of the roll is held until approximately 78° at which time the roll 36 commences to lead the roll 34. The metal of the seam which has been deformed by the roll 36 will, during this time, traverse the drum until such time as it reaches the roll 34. The roll 34 then leads the roll 36 as at $f$ and further deforms the metal of the seam, and when the thus deformed metal reaches the roll 36 at 84° this latter roll moves into engagement with the seam for a short portion of the cycle until it again commences to lead the roll 34 at approximately 90° in the cycle. This alternate leading by the two rolls 34 and 36, followed by a short interval of equal lead, is repeated four times during the machine cycle and because of such cooperation between the rolls a very uniform seam is effected and any inequalities or discrepancies in the coefficient of stress of the metal will not result in uneven strain. Furthermore, the work which each roll is required to perform to bring the seam to the form it assumes in Fig. 8 is materially reduced and as a consequence wearing of the grooves 38 is reduced to a minimum.

It is to be noted that each time the roll 34 is moved or advanced toward the central axis of the drum 20 to a new position wherein it performs a deforming operation on the seam, it is maintained in its new or advanced position until such time as the roll 36 leads the roll 34. It is also to be noted that the duration of time in which the roll 34 leads the roll 36 is sufficient to permit the thus deformed seam to arrive at the roll 36. Thus, in each of the regions $d$, $l$, $q$ and $v$ of the chart of Fig. 12, the roll 34 leads the roll 36 for approximately 30° in the cycle. Since the drum is rotating ten times as fast as either the cam 124 or 126, and since the rolls 34 and 36 contact the seam at points which are spaced apart 60°, the roll 34 will, each time it advances, hold its position while the drum rotates substantially 300°, or in other words, until such time as the deformation caused by the roll 36 reaches the roll 34. The net result of the alternate leading of the two rolls 34 and 36 is that the roll 34 leads the roll 36 at four intervals in the cycle and these intervals are of such duration that the deformation of the seam caused by the roll 34 reaches the roll 36. Similarly the roll 36 leads the roll 34 at four points in the cycle and each time it holds this lead until the deformation it has caused in the seam reaches the roll 34.

After the seam has been deformed to the extent shown in Fig. 8, at approximately 222° in the cycle, the finishing cam 122 causes the slide 136 to commence its downward descent and at approximately 228° the finishing roll engages the seam and performs its flattening operation thereon until approximately 288° in the cycle. At approximately 288° in the cycle, and after the seam has been flattened to the extent shown in Fig. 9, the finishing roll 40 is rapidly retracted so that it will arrive at its fully retracted position at approximately 324° in the cycle. The finishing roll 40 is capable of performing its flattening operation on the seam although the cam 122 is not shown in the drawings as leading either the cam 124 or 126, but it will be understood that the specific shape of the groove 42 is such that a flattening operation will be performed upon the seam when the slide 136 is in its lowermost position.

The sequence of roll advance will be readily apparent to those skilled in the art from the foregoing description taken in connection with Fig. 12 which accurately shows the step-by-step alternating advance of the forming rolls 34 and 36 in relation to the timing of the cams 124 and 126. However, to afford a more ready appreciation of what this means in terms of revolutions of the drum, the same cycle has been shown in a somewhat different form in Fig. 12$a$, with the roll steps identified by the same reference letters as in Fig. 12.

As described heretofore, both rollers are advanced simultaneously through step $b$ after maintaining initial contact $a$ with the flange for a short portion of a revolution of the drum. Both rolls accordingly curl the flange inwardly the same amount while the drum rotates through an angle corresponding to the spacing of the rolls circumferentially of the flange or 60° in the exemplary embodiment. As the section of the flange curled down by the roll 36 reaches the roll 34, the drum rotating anticlockwise as viewed in Fig. 12$a$, roll 34 is advanced a further step $c$ to curl down the flange still more.

Upon rotation of the drum through an angle of 300° following the advance $b$ of the rolls, the rim section curled down by roll 34 arrives at roll 36. Roll 34 is then advanced a step $e$ causing it to lead the roll 34. This lead is maintained through 60° of drum revolution at which time the roll 34 is advanced in step g and, after a further 60°, through step k.

Such alternate advances of the rolls continue until the seam has been curled down sufficiently for the application of the flattening roll 40 as above described. Each roll is thus enabled to break down or curl the metal of the flanges at the maximum rate permitted by the character of the metal. Formation of the seam can therefore be completed in a minimum number of revolutions of the drum, in this instance, approximately half the number required with previous machines, with a corresponding increase in the productive capacity of the machine.

After the seam has been fully formed and assumes the shape in which it has been illustrated in Fig. 9, the cycle of machine operations is complete and at this time rotation of the various cams 124, 126 and 122 as well as rotation of the drum 20 terminates. Such termination of machine operations may be accomplished by opening the circuit leading to the electric driving motor of the machine. After rotation of the drum has been terminated, motive fluid is supplied to the hydraulic cylinders 64 in such a manner that the two machine castings 70 are moved in opposite directions away from each other so that the chucks are thus withdrawn from the completed drum.

Heretofore in actual practice considerable difficulty has been encountered in stripping the chucks 33 from the annular flanges 24 provided by the barrel head at opposite ends of the barrels, and this difficulty has been obviated by the provision of the stripper plates 71, the openings 73 of which are slightly smaller than the overall diameter of the finished seam. Thus, as the chucks are moved away from each other in unison, one or the other thereof will pull away from its respective head and thereafter the other head will engage its respective stripper plate so that further longitudinal or axial movement of the finished barrel is prevented and in order that the chuck may then pull away from this latter head.

The machine permits effective seaming of barrels in the manner just described effectively and efficiently and the same may be adapted for seaming barrels of various lengths and diameters.

I claim as my invention:

1. A seaming machine for seaming a flanged sheet metal head to the circumferentially flanged end of a sheet metal drum which comprises in combination, means for rotating the assembled drum and head about the axis of the drum with the flanges contiguous to one another, first and second grooved rollers lying in the plane of the flanges and spaced from one another about the flange periphery, each of said rollers having a flange-receiving annular groove for receiving and curling the flanges, first and second supports for mounting said rollers respectively and radially movable with respect to the drum, first means drivingly coupled to the drum rotating means for positively advancing the first roller support toward the flanges into a flange-curling position for imparting an initial curl to the flanges, and second means drivingly coupled to said drum-rotating means for positively advancing the second roller support into a flange-curling position which is advanced incrementally beyond the position of the first roller and timed with respect to the arrival at the second roller of the section of the flange curled by the first roller, said advancing means including means for thereafter advancing the roller supports alternately by incremental amounts, each roller achieving substantial lead with respect to the other roller and timed with respect to the arrival at each roller of the section of the flange operated on by the other roller.

2. A seaming machine constructed in accordance with claim 1 in which the first and second advancing means respectively comprise cams positively coupled to the drum rotating means.

References Cited in the file of this patent

UNITED STATES PATENTS

| | | |
|---|---|---|
| 827,163 | Lindgren | July 31, 1906 |
| 1,096,937 | Nichols | May 19, 1914 |
| 1,275,867 | Davis | Aug. 13, 1918 |
| 1,711,336 | Wery | Apr. 30, 1929 |
| 1,811,405 | Rhodes | June 23, 1931 |
| 2,040,785 | Esch | May 12, 1936 |

FOREIGN PATENTS

| | | |
|---|---|---|
| 8,483 | Norway | Nov. 28, 1899 |
| 290,474 | Germany | Mar. 2, 1916 |
| 652,760 | Germany | Nov. 8, 1937 |